3,312,342
PROCESS AND APPARATUS FOR IMPACTING AND ELUTRIATING SOLID PARTICLES

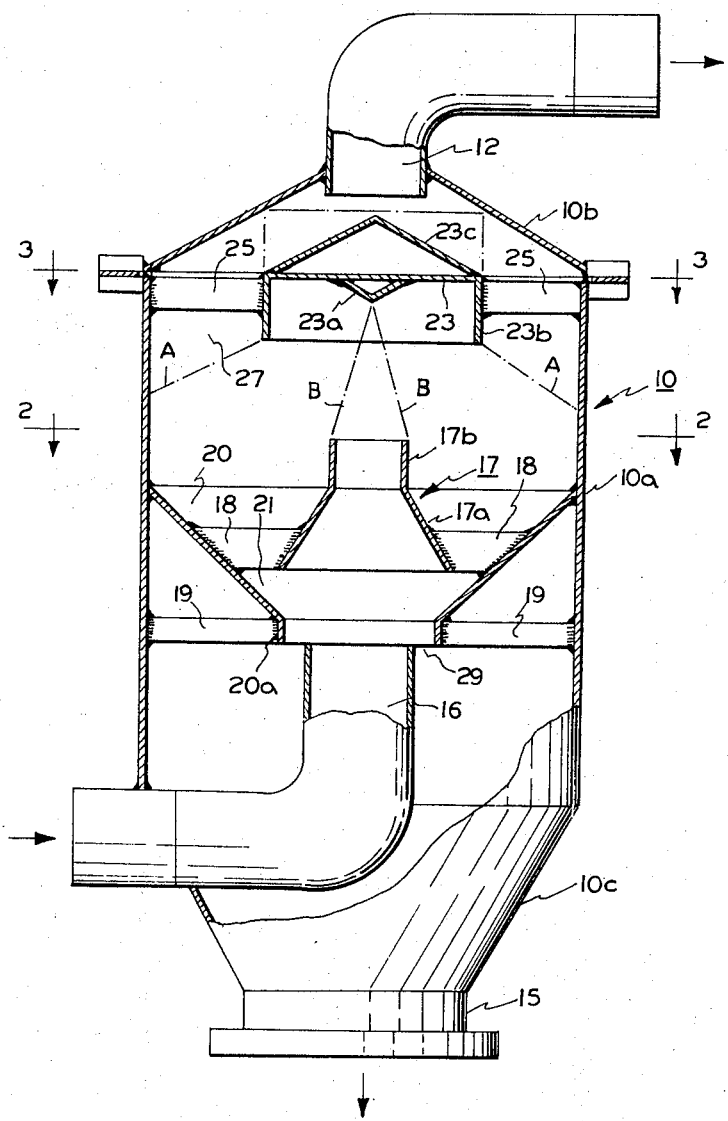
FIG. I

George N. Brown, Wilmington, Del., assignor to E. I. du Pont de Nemours and Company, Wilmington, Del., a corporation of Delaware
Filed Mar. 27, 1964, Ser. No. 355,395
6 Claims. (Cl. 209—3)

This invention relates to a process and apparatus for particulate solids impacting and elutriating, and particularly to a process and apparatus for sequentially impacting and elutriating solids at very high throughput rates and with conservation of the energy requirements.

There are numerous process industries which benefit from sequential solids impacting followed by immediate elutriation separation of the fines, one of these being the deagglomeration of flake thermoplastics, such as polyamides and the like. Yet another example is that of cereal grains which, upon removal from protracted storage, frequently require that any insects harbored therein be killed by impacting and that any rodent excrement or other foreign material be removed, as by elutriation, in order to meet the applicable foodstuff statutory regulations.

Figure 3:
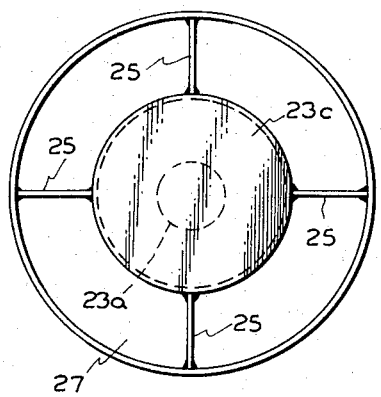
Figure 2:
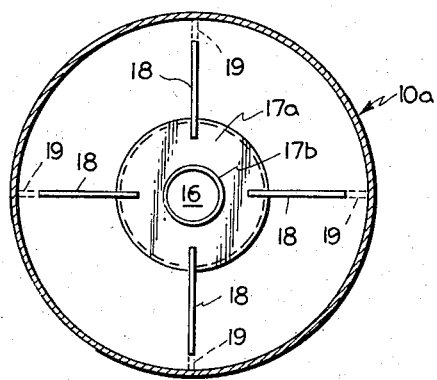
Figure 4:
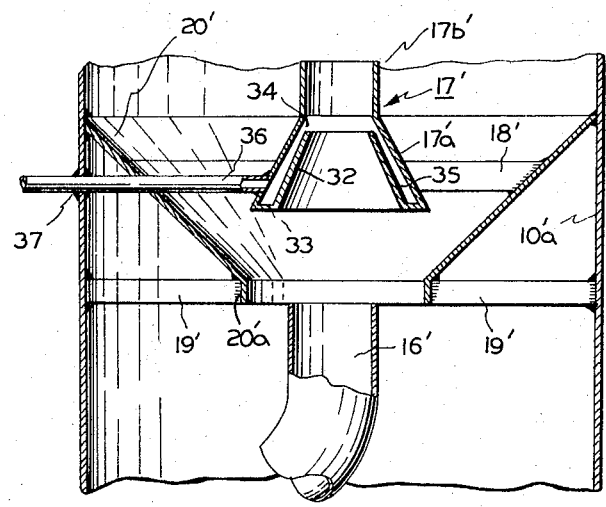
Figure 5:
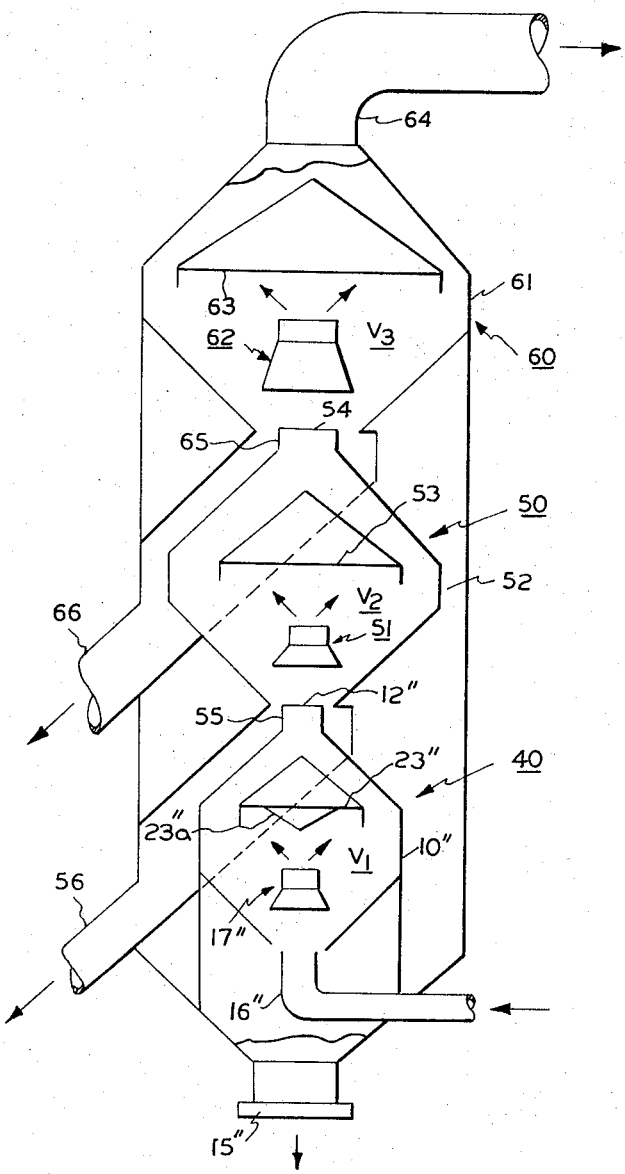

An object of this invention is to provide an improved method and apparatus for particulate solids impacting and elutriation which dispenses with moving parts, is capable of handling very high throughputs per unit time, and wherein the apparatus is compact and well-adapted for series circuit installation in particulate solids handling installations. Other objects of this invention are to provide a method and apparatus for the rapid sequential impacting and elutriation of solids with great energy conservation, and without objectionable noise, and the provision of apparatus for the purposes which is low in first cost and maintenance. The manner in which these and other objects of this invention are attained will become clear from the detailed description and the drawings, in which:

FIG. 1 is a broken longitudinal cross-sectional view of a preferred embodiment of apparatus according to this invention, FIG. 2 is a section on line 2—2, FIG. 1, FIG. 3 is a section on line 3—3, FIG. 1, FIG. 4 is a broken section of a second embodiment of the apparatus of FIG. 1 provided with an auxiliary eduction gas source, and FIG. 5 is a schematic view in longitudinal section of a multiple series arrangement of solids impacter-elutriators according to this invention, each adapted to remove sequentially a preselected particle fraction from a mixed feed introduced to the lowermost apparatus.

Generally, this invention comprises a method and apparatus for sequentially impacting and thereafter elutriating a stream of gas-entrained solid particles comprising directing the stream vertically against an impacting surface deflecting the solid particles along a downward course wherein the force of gravity is superadded to deflectional rebound forces acting on the particles, elutriating the particles with gas traversing the main body of particles generally normal of their downward course, exhausting gas entraining solid particles of low effective density therein after traversal of the main body, and collecting the remaining particles as a high effective density particle fraction.

Elutriation has been defined as the process of separating a material into fractions of various size by allowing it to settle against an upward moving stream of fluid, usually air or water. However, a somewhat better definition is that describing the process as a separation of particles of a powder from the heavier by washing and decantation. In any case, this invention employs gaseous fluids solely (cutomarily air, although other gases or gaseous mixtures can be employed), and effects its washing of the heaviest particles, at least, by a transverse gas sweep generally normal of the downwardly deflected particulate material which has superadded to the deflectional rebound forces acting thereon the force of gravity.

Croft's formula gives the velocity required to just float a particle in the turbulent state and is thus helpful in selecting suitable elutriative velocities for different materials to be processed, this formula being:

$$V = K\sqrt{d\left(\frac{\rho}{G}-1\right)}$$

where $V$ = velocity in ft./sec.
$d$ = diameter of particle, inches
$\rho$ = density of material, lbs./ft.$^3$
$G$ = density of gas, lbs./ft.$^3$
$K$ = a constant depending upon the particle shape (e.g., 1.87 for spheres, 1.41 for rounded particles, 1.01 for flattened particles or flakes, and 1.24 for average shapes).

From the formula, it is seen that particle size cannot be relied upon solely as the basis upon which elutriative separation depends, but that a composite characteristics, which is hereinafter denoted the "effective density," is really the responsible factor. Of course, it will be understood that this in no way changes the fact that fine particles can very often be separated from coarse particles by elutriation, but the mechanism of the separation is by no means a simple function of particle size alone.

Referring to FIG. 1, a preferred vacuum type embodiment of apparatus according to this invention intended for the removal of fine particulate solids from coarse comprises an upright steel housing 10 (wall thickness ⅛"), which has a length in the intermediate straight cylindrical section 10a of, typically, only 2'-4", and a diameter of, typically, 1'-10", closed at the ends by frusto-conical caps 10b, of removable flanged construction, and 10c, integrally welded to section 10a, which are each, typically, only 8" long and 12½" long, respectively. The elutriated fine particle fraction is withdrawn through the upper exit port 12 leading to a conventional bag filter, cyclone separator, or other device, not shown, adapted to remove entrained solids from the vented gas stream (in this case air), whereas the coarse particle fraction is removed gravimetrically through bottom exit port 15 leading to a collection bin, freight car or other benefited product receptacle, not shown.

Solids are introduced into the apparatus through open-ended vertically directed conduit 16 which discharges, typically, 8" above the lower end of housing section 10a. Conduit 16, in the specific apparatus described, was a 4" diameter, schedule 40 pipe having its discharge end disposed concentric with section 10a. Directly thereabove, at a spacing of about 4", is concentrically mounted flow-confining chimney 17, which consisted of a converging frusto-conical section 17a 8" in dia. at the base and 4" dia. at the upper end, 4" in height, which was provided on the top with a 2" long cylindrical extension 17b. Chimney 17 was supported in place by four radial steel straps 18 2" x ¼", spaced 90° apart and welded at the inner ends to the chimney and at the outer ends to the inside of catch funnel 20, hereinafter described.

Inverted frusto-conical catch funnel 20, tack welded peripherally at its upper end to the inside of section 10a, measured 22" dia. at the upper end and 8" dia. at the lower end and was of 7" length, with upper edge disposed 8" above the discharge opening of conduit 16. In order to prevent by-pass deflection of solids at the latter point and also improve the eductor action later described, it was found best to install a 1″ long cylindrical extension 20a depending from the lower edge of the funnel, which, thus, brought the lowermost extreme to the level of solids discharge out of conduit 16. Extension 20a is preferably steadied radially by four equiangularly spaced struts 19 welded at the outer ends to the inside of section 10a and at the inboard ends to the outside periphery of the extension. The construction described provided an annular coarse solids removal interspace 21 between the base periphery of chimney section 17a and the adjacent inside periphery of funnel 20 measuring 3″ radially, and a lower coarse solids escape annulus 29 measuring 2″ radially.

Superjacent the top end of chimney extension 17b (in this instance 10″ above it), and concentrically disposed with respect to housing 10, is a 12″ dia. impact plate 23 constructed of, or sheathed with, heavy wear-resistant metal, such as stellite or the like. Plate 23 was provided with a central downwardly oriented conical protuberance 23a of 2″ altitude measuring 4″ dia. at the base, thus overlying the entire solids ejection area of extension 17b, and had appended a cylindrical skirt portion 23b of, typically, 3″ length. Impact plate 23 is supported in place by four equiangularly separated radial steel straps 25, 2″ x ¼″, welded at one end to the plate and skirt 23b and at the other end to the inside of housing section 10a, and the reverse side of the plate was provided with a conical fairing portion 23c, which contributed to smooth streamlined flow of air-entrained fines via exit port 12. The annular clearance 27 between skirt 23b and section 10a constitutes a high velocity restricted passage for the draw off of elutriated solids, which is accelerated progressively by the diametrical narrowing down conferred by cap 10b. The lower end of the pipe defining exit port 12 is preferably extended downwardly about 2″ to interpose a peripheral turbulence in the region of fines removal, which insures the rejection and drop back of any oversize particles carried along with the elutriated fines.

In the specific apparatus described, operation is conducted under vacuum conditions (typically, 12″ Hg, corresponding to approximately 8.7 lbs./sq. in. absolute pressure), although, of course, operation can equally well be at superatmospheric pressures if desired. Under these conditions, the air velocity at the exit of conduit 16 is in the range of about 5,000 to 10,000 ft./min., with the corresponding entrained solids velocities being 1,000 to 5,000 ft./min., respectively.

Polyamide chip, in the course of manufacture, is received from a rotary chopper which, in turn, is supplied from a cooling drum solidifying the molten polymer in sheet form. The chopper breaks the polymer into a fairly uniform chip size; however, a small amount of fines and short fiber-like cuttings are produced incidentally, a typical analysis conducted on a 2.175 lb. sample being as follows:

| U.S.S. Mesh Screen | Net Lbs. Polymer Retained on Screen | Percent Polymer Retained on Screen |
| --- | --- | --- |
| 4 | 0.73 | 33.4 |
| 10 | 1.40 | 64.5 |
| 16 | 0.040 | 1.80 |
| Pan | 0.005 | 0.20 |
|  | 2.175 | 100.00 |

Actually, not all of the material collected in the pan constituted dust, a careful analysis revealing that, in a representative 230 lbs. sample, only 0.12 lb. (i.e., 0.05%) was of objectionable dust grade. This dust is particularly troublesome because of its tendency to temporarily hang up in any polymer processing system, probably due to the development of electrostatic charges thereon, and it has been found that only relatively heavy impacting of the chip stock, followed by immediate solid particle mutual scouring with concomitant elutriation is effective in de-agglomeration, disengagement and removal.

In operation, air-entrained solids ejected from conduit 16 travel vertically upwards at relatively high velocities and are constrained in flight to a dense consolidated stream by chimney 17 well past the upper end of funnel 20, finally flaring out somewhat so as to impact largely against conical protuberance 23a, but to some extent also against the surrounding annular expanse of plate 23. Skirt 23b confines downward rebound mainly to the outward limiting frusto-conical surface A, whereas protuberance 23a similarly sets the general inside rebound course principally along frusto-conical surface B. It will be understood, of course, that these are only general limits within which the great majority of the solid particles are to be found; however, interparticle collisions and multiple richochet type impacting cause highly random particle travel within the curtain A–B, and to some extent even therebeyond. This is believed to be positively beneficial in not only disengaging surface-occluded dust by extensive inter-particle scouring action but in also lengthening the particle-contacting path of the elutriation air, which is the exhausting entrainment air entering the apparatus via conduit 16.

A very important effect of this entrainment air is the strong eductor action which accompanies the exiting from conduit 16. This draws in air back through interspace 21 and recycles any fine solids fraction entrained therein which may have had insufficient elutriation during the immediately preceding air-solids contacting above funnel 20. It is not known how many of these recycles are required for best results in the dust removal, but, in any case, the chip recovered as product by gravimetric escape through escape annulus 29, and thence through port 15, is practically entirely dust-free.

Moreover, the entrained dust removed through port 12 is readily collected in a conventional dust filter, so that it can constitute no nuisance through contamination of the atmosphere. A particular advantage of the apparatus is its relatively light weight and compactness, making it ideal for temporary placement over the loading doors of a gondola bulk shipment railway car, or the like, for discharge direct to the transportation vehicle.

For the vacuum design hereinbefore detailed, it is necessary to connect port 15 to the product receiver at atmospheric pressure through a conventional air lock, such as a continuously discharging rotary vane feeder valve, or the like. Or, sequentially operating paired slide-gate valves can be employed for intermittent discharge, with temporary accumulation of solids therebetween until dumping become worthwhile.

If pressure operation is resorted to, port 15 communicates directly with the receiver, which may conveniently be closed at all other inlets except one and the latter connected directly to a bag filter, such as that of the conventional blown rock wool building insulation placement type for removing all entrained solids from air displaced from the receiver.

Elutriation, consisting as it does of gas sedimentation as a function of effective density, commences on any free entrained fine particles immediately after they clear the upper end of chimney 17, because, due to the low masses of the small-sized particles, these possess less momentum than their coarser neighbors. Thus, the finest particles never reach impact plate 23 and cone protuberance 23a at all but are, instead, wafted away laterally as the entrainment air expands to fill the entire volume of housing 10. However, this brings the fines at once into the curtain of downwardly deflected solids and, thereafter, the elutriation has scouring and some actual air flow impediment superimposed, so that the ultimate overall fines removal action becomes very complicated indeed.

It is believed that the overall elutriative efficiency is markedly improved by the deflection of solid particles along a downward course wherein the force of gravity is superadded to deflectional rebound forces acting on the particles. At the same time gas sweeping of the solids fall-out generally normal of the main downward course apparently subjects the gas to a near optimum scrubbing action, so that the exiting gas stream carries with it a sharply defined particle fraction without appreciable adulteration by out-of-range particles.

An alternate design providing desirable regulability of eductor action is that shown in FIG. 4, wherein all components identical with those of the apparatus of FIG. 1 are denoted by the same reference numerals, however with a prime appended.

Here chimney section 17a' is provided with a generally concentric frusto-conical insert 32 of a somewhat larger base angle than that of 17a', so that the clearance therebetween is approximately ½" at the base, narrowing progressively to about ⅛" at the top. Insert 32 is secured in place to section 17a' by a welded ring piece 33, sealing off the base clearance therebetween, the upper end being left open to create a 180° gas discharge slot 34 measuring about ⅛" radially. The plenum chamber 35 defined by insert 32 and section 17a' is supplied with gas under pressure via line 36 (typical, 1" dia.) led outside section 10a through welded seal 37.

In operation, air introduced to plenum chamber 35 under a pressure of, typically, 5 lbs./sq. in. gage supplements the eduction maintained recycle action of the entrainment air discharged from conduit 16. Also, since the entrainment air frequently surges, the supplementary air supplied through slot 34 has the effect of leveling out the pressure of air passed through chimney 17', thus improving the overall performance.

Important advantages of apparatus of this invention are compactness, which facilitates installation in restricted areas as well as confers portability, dispensing with additional mechanical equipment together with service line connections, since, except for the relatively small requirement of the design of FIG. 4, no auxiliary air supply is required over the conventionaly air entrainment utilized for solids handling systems as a whole, and extremely high capacity per unit volume size. In addition, for best results elutriation must follow immediately upon impacting, as is accomplished here, which gives an extremely high efficiency in the removal of a specific particle size as a result of the combined action of impaction, air washing, inter-particle scouring and re-entrainment of any fines which happen to escape elutriative removal on an earlier pass.

The diameter and length of the apparatus will, of course, depend on the air velocity and volume required to convey and elevate the specific particles sizes involved in the particular feed. In practice, a 100% increase in air volume has been found to be practicable in varying particle size separation with little change in the good performance of the apparatus, as is particularly hereinafter demonstrated by the apparatus of FIG. 5. Funnel 20 is not especially critical as to either slope or size or lower opening, and so can be selected to best suit the angle of repose or other properties of the process solids. The size and location of chimney 17 can be varied within wide limits; however, the distance from the outlet to solids impact plate 23 is relatively critical, since excessive divergence of solid particles after passage through the chimney can result in entrainment losses of some larger particles with the fines. Similarly, skirt 23b depending from impact plate 23 blocks deflection of any coarse solids in return travel from unwanted entrance into the zone of high velocity entrainment air exhaust, with accompanying danger of loss as fines.

Conical protuberance 23a is advantageous in balancing and evenly distributing solids throughout a uniform frustoconical return path curtain, thereby equalizing entrainment air passage therethrough over the full 360° expanse of the curtain. Nevertheless, operation has proved practicable without this refinement.

The lower region of housing 10 is amenable to wide design variation and can be fabricated in any form assisting product removal in a specific installation, such as by incorporation of a removal cap 10c with integral terminal flange for connection with a matched downstream receiver as in the design elaborated, or in many other respects. If desired, the lower region can be made in sufficient size to accumulate a substantial quantity of solids in temporary storage.

Prefered dimensional relationships for the specific apparatus detailed in FIGS. 1–3, inclusive, variable within ±10% without sacrifice of appreciable elutriative efficiency, are as follows, all based on a solids introduction conduit 16 of diameter $n$ servicing air velocities of between 5,000 and 10,000 f.p.m.

Solids introduction conduit dia.—$n$
Dia. extension 20a—$2n$
Dia. section 10a—$5n$
Vertical distance from lower end of extension 20a to top of straps 25—$5n$
Vertical distance from discharge opening of conduit 16 to lower end of low chimney section 17a—$n$
Inlet diameter, chimney section 17a—$2n$
Exit diameter, chimney section 17a—$n$
Length, chimney section 17a—$n$
Length, chimney extension 17b—$0.5n$
Vertical distance from top of chimney extension 17b to impact plate 23—$2.5n$
Impact plate 23 dia.—$3n$
Protuberance 23a dia.—$n$
Protuberance 23a height—$0.5n$
Length of skirt 23b—$0.75n$ It will be understood that not all of the foregoing relationships are critical to operation as a complete apparatus, since use of a number of the features proportioned has been hereinbefore described as optional, in the sense of being in the realm of design choice. However, if these elements are all used in conjunction one with another as elaborated, the proportioning relationship given insures good operation for the assembly as a whole.

The apparatus of this invention is not limited in use to merely the separation of dust from coarser material, but can, for example, be arranged in multiple-series connection to achieve a relatively precise particle fractionation, as shown schematically in FIG. 5.

Here there are provided three individual impacterelutriators 40, 50 and 60, essentially identical in design with the apparatus of FIG. 1, which are connected with discharge of one serving as solids-gas input to the nextsucceeding one. The volumes of these impacter-elutriators are preselected, in ascending order, to provide an expansion in each such that the elutriated fraction swept out is limited to a particle range which it is desired to process further, whereas the coarse material falling back is confined to that particle range which it is desired to withdraw as product in the particular stage involved.

Thus, conduit 16" constitutes the input for the entire apparatus, and this impacts upon conical protuberance 23a" and plate 23", in exactly the same maner as hereinbefore described for the apparatus of FIG. 1. The volume of chamber 10" of unit 40 is preselected to give a relatively high elutriative velocity $V_1$, so that only the coarsest material is left behind to escape through exit port 15" as one of the recovered product fractions.

The effluent from unit 40 sweeps upwardly through vertically oriented port 12", where it discharges into chimney 51 of the next-succeeding impacter elutriator 50. The volume of housing 52 is enlarged over the housing of unit 40, so that the elutriative velocity $V_2$ is considerably lower in this chamber. Impacting in this instance is, optionally, against a flat impact plate 53, with fine solids swept out via upper port 54, whereas the coarse solids fraction falls back through annular collection port 55, from whence it is accumulated by take-off through downwardly slanted chute 56 leading to a product cut collector, not shown.

Again, the effluent from unit 50 passes through port 54 and thence through chimney 62, to impact against flat plate 63 and thence be redirected downwardly within housing 61. The volume of the latter is enlarged over that of the housing of unit 50, so that the elutriative velocity $V_3$ here is reduced to a final preselected value withdrawing the fines as product through top exit 64, whereas the non-entrained solids fraction falls back and is removed as a product cut through annular port 65, with collection through slanted chute 66 to an appropriate vessel not shown.

The operation of the apparatus of FIG. 5 will be clear from the following example. The material to be classified comprised chopped polyethylene scrap, which had the following screen analysis, the elutriative floating velocity for the several particle fractions being tabulated adjacent each:

| On U.S.S. screen size: | Floating velocity, f.p.m. |
|---|---|
| 4 | 140 |
| 8 | 120 |
| 14 | 105 |
| 20 | 95 |
| 60 | 43 |
| Fines | 30 |

It was desired to separate all particles larger than 8 mesh as the coarsest fraction, under which circumstances chamber 10″ was preselected to be of a size which, coupled with the entrainment gas-solids velocity as received via conduit 16″, gave a $V_1$=approximately 100–115 f.p.m. The large particles then were collected as output from port 15″, whereas the remainder of the feed was entrained via upper port 12″ into chamber 52.

Here it was desired to separate all particles larger than 20 mesh as a coarse cut withdrawn through chute 56. Therefore, chamber 52 was proportioned, in the light of the velocity of entrained gas-solids input thereto, give a $V_2$=approximately 45–90 f.p.m., typically 75 f.p.m., under which circumstances everything finer was elutriated into unit 60 via port 54.

As a final cut, it was desired to obtain solids larger than 60 mesh within unit 60, so the volume of the latter was preselected with reference to the gas-solids input to give $V_3$=32–40 f.p.m., preferably 35 f.p.m., whereupon all solids of particle size 60 mesh or coarser escaped through annular port 65 and chute 66 to a separate receiver, while the fines were elutriated off through top exit 64.

Yet another important use for the apparatus of this invention is the separation of tramp metal or other dense adulterants, such as sand, stones and the like which somehow find their way into the stream of polymer or other product production. Much of this impurity is non-magnetic, and thus difficult to remove, such as, for example, aluminum, copper, some stainless steels and stones or sand, and presents a serious problem from the standpoint of customer complaints.

The apparatus of this invention is ideal for the complete separation of adulterants of this nature, with 100% recovery of all else, even though the particle range involved is quite broad. Thus, as an example, the critical floating velocities are tabulated for a No. 10 aluminum nut, as compared with several sizes of polyamide particles:

| Material: | Critical floating velocity, f.p.m. |
|---|---|
| No. 10 aluminum nut | 3060 |
| 2½ mesh polymer | 1540 |
| ¼″ x ¾″ "noodle" polymer | 1230 |
| 20 mesh polymer | 660 |

Using a single impacter-elutriator unit, it will be seen that an absolutely clean and dependable separation of all polymer from adulterants of the type represented by the aluminum nut occurs at an elutriative gas velocity of between about 1600 and 2000 f.p.m., preferably 1800 f.p.m., with all of the polymer being carried through as entrained product, whereas adulterants are left behind as residue. The separation can be carried out practically as an incident of pneumatic conveying, and at such low cost and convenience as to be practically indispensable to the usual manufacturing operation.

From the foregoing, it will be apparent that this invention is subject to very wide modification within the skill of the art without departure from the essential spirit, and it is accordingly intended to be limited only within the scope of the following claims.

What is claimed is:

1. A solids impacter and elutriator comprising, in combination, an upright housing, an upwardly directed gas-entrained solids-introducing conduit mounted concentrically within said housing, a flow-confining chimney mounted coaxially of and superjacent the discharge opening of said conduit, a solids impact plate mounted coaxially of and superjacent the top of said chimney, a high effective density particle catch funnel having its upper edge flush with the inside wall of said housing disposed subjacent said impact plate generally concentrically of said chimney and on the same level therewith proportioned so as to define with said chimney an annular high effective density particulate solids escape path, and outlet ports at the top and bottom of said housing for the withdrawal of low effective density and high effective density solids fractions, respectively.

2. A solids impacter and elutriator according to claim 1 wherein said solids impact plate is provided with an inverted conical protuberance mounted concentrically thereof, the base of said protuberance being substantially equal to the diameter of said solids-introducing conduit, and a downwardly depending skirt attached peripherally of said impact plate.

3. A method of sequentially impacting and thereafter elutriating a stream of gas-entrained solid particles comprising directing said stream substantially vertically and upwardly against an impacting surface, constraining said stream in flight prior to said impacting, deflecting said solid particles along a downward course wherein the force of gravity is super-added to deflectional rebound forces acting on the particles, elutriating the particles with gas traversing the main body of said particles generally normal of said downward course, exhausting said gas entraining solid particles of low effective density therein after traversal of said main body, re-entraining particles of low effective density carried down with the particles of high effective density, recycling the re-entrained particles of low effective density with said stream of gas-entrained solids, and removing said particles of high effective density as a separate product fraction.

4. A solids impacter and elutriator for service in the 5,000 to 10,000 ft./min. particulate solids conveying gas velocity range comprising, in combination, an upright housing of diameter equal to about 4.5–5.5n as hereinafter defined, an upwardly directed air-entrained solids-introducing conduit of discharge diameter $n$ mounted concentrically within said housing, a vertically disposed flow confining chimney made up of a lower frusto-conical section surmounted by a cylindrical section of diameter at the lower end equal to about 1.8–2.2n, diameter at the upper end equal to about 0.9–1.1n, length overall equal to about 0.9–1.1n, and length of said cylindrical section equal to about 0.45–0.55n, mounted coaxially of and superjacent the top of said conduit with a vertical clearance therebetween equal to about 0.9–1.1n, a circular solids impact plate of diameter equal to about 2.7–3.3n mounted coaxially of and superjacent the upper end of said cylindrical section with a vertical clearance therebetween equal to about 2.0–3.0n, a high effective density particle catch funnel having its upper edge flush with the inside wall of said housing disposed subjacent said impact plate generally concentrically of said chimney and with upper edge on approximately the same level as the upper end of said lower frusto-conical section proportioned so as to define with said chimney an annular high effective density particulate solids escape path having a lower opening diameter of about $1.8$–$2.2n$, and outlet ports at the top and bottom of said housing for the withdrawal of low effective density and high effective density solids fractions, respectively.

5. A multi-stage method of particulate solids fractionation comprising, in series and as successive operations, impacting and thereafter elutriating a stream of gas-entrained solids particles traversing each of said successive operations entrained at a lower gas-solids velocity than preserved in earlier ones of said successive operations by directing said stream substantially vertically and upwardly against an impacting surface, constraining said stream in flight prior to said impacting, deflecting said solid particles along a downward course wherein the force of gravity is super-added to deflectional rebound forces acting on the particles, elutriating the particles with gas traversing the main body of said particles generally normal of said downward course, exhausting said gas entraining solid particles of low effective density therein after traversal of said main body, re-entraining particles of low effective density carried down with the particles of high effective density, recycling the re-entrained particles of low effective density with said stream of gas-entrained solids, and removing said particles of high effective density as a separate bottom product fraction.

6. An apparatus for the multi-stage fractionation of particulate solids comprising, in combination, a plurality of series-connected solids impacter-elutriators of progressively increasing elutriation chamber volumes, each consisting of an upright housing, an upwardly directed gas-entrained solids-introducing conduit mounted concentrically within said housing, a flow-confining chimney mounted coaxially of and superjacent the discharge opening of said conduit, a solids impact plate mounted coaxially of and superjacent the top of said chimney, a high effective density particle catch funnel having its upper edge flush with the inside wall of said housing disposed subjacent said impact plate generally concentrically of said chimney and on the same level therewith proportioned so as to define with said chimney an annular high effective density particulate solids escape path, and outlet ports at the top and bottom of said housing for the withdrawal of low effective density and high effective density solids fractions, respectively, said outlet port at the top constituting said solids-introducing conduit for the next-following one of said series-connected solids impacter-elutriators and said outlet port at the bottom being the delivery port for the particular high effective density solids fraction segregated within an individual one of said series-connected solids impacter-elutriators.

References Cited by the Examiner

UNITED STATES PATENTS

| | | | |
|---|---|---|---|
| 1,699,441 | 1/1929 | Negro | 241—40 X |
| 1,700,713 | 1/1929 | Campion | 241—40 X |
| 1,875,531 | 9/1932 | Walton | 241—40 |
| 1,912,910 | 6/1933 | Neuman | 209—138 X |
| 2,389,701 | 11/1945 | Truesdale | 209—139 |

FOREIGN PATENTS 485,868  11/1929  Germany.

FRANK W. LUTTER, *Primary Examiner.*

UNITED STATES PATENT OFFICE
CERTIFICATE OF CORRECTION

Patent No. 3,312,342                      April 4, 1967

George N. Brown

It is hereby certified that error appears in the above numbered patent requiring correction and that the said Letters Patent should read as corrected below.

Column 3, line 60, for "33.4" read -- 33.5 --; column 4, line 51, for "become" read -- becomes --; column 5, line 23, for "typical" read -- typically --; line 39, for "conventionaly read -- conventional --; column 9, line 15, for "entrained" read -- in train --.

Signed and sealed this 7th day of November 1967.

(SEAL)
Attest:

Edward M. Fletcher, Jr.

Attesting Officer

EDWARD J. BRENNER

Commissioner of Patents